United States Patent [19]

Warman

[11] 4,320,257

[45] Mar. 16, 1982

[54] COMPENSATION OF TRANSMISSION LOSSES IN A TELEPHONE SYSTEM

[76] Inventor: Bloomfield J. Warman, 67, King Harold's Way, Bexleyheath, Kent, DA7 5RE, England

[21] Appl. No.: 91,687

[22] Filed: Nov. 5, 1979

Related U.S. Application Data

[63] Continuation-in-part of Ser. No. 895,562, Apr. 12, 1978, abandoned.

[30] Foreign Application Priority Data

Apr. 23, 1977 [GB] United Kingdom ............... 15430/77

[51] Int. Cl.³ .......................... H04M 1/76; H04B 3/10
[52] U.S. Cl. ............................... 179/16 F; 179/1 CN; 179/170 A; 179/170 R
[58] Field of Search ................. 179/1 CN, 16 F, 81 B, 179/84 VF, 18 BC, 170 R, 170 A, 175.2 R, 175.2 C, 175.3 R, 175.31 R; 330/52; 333/15, 16

[56] References Cited

U.S. PATENT DOCUMENTS

| | | | |
|---|---|---|---|
| 2,154,579 | 4/1939 | Parrott | 179/1 CN |
| 3,302,175 | 1/1967 | Deracinois et al. | 179/170 A |
| 3,360,748 | 12/1967 | Fish et al. | 333/16 |
| 3,838,230 | 9/1974 | Bohman et al. | 179/170 A |
| 3,918,003 | 11/1975 | Seidel | 330/52 |
| 4,017,695 | 4/1977 | Jaconetty et al. | 179/170 R |

Primary Examiner—Bernard Konick
Assistant Examiner—Randall P. Myers

Attorney, Agent, or Firm—Sughrue, Mion, Zinn, Macpeak and Seas

[57] ABSTRACT

In a telephone system, compensation for transmission losses over any given section of the transmission path is achieved by inserting at a selected location in the telephone transmission path a variable gain amplifying means, sensing the amplitude of a multi-frequency tone signal received from a standard multi-frequency tone sending device located at a point in the telephone transmission path distant from said selected location, said tone sending device being adapted to emit multi-frequency tone signals within the voice frequency band at a predetermined reference level, and varying the gain of said amplifying means in accordance with the difference between the amplitude of said sensed tone signal and the said predetermined reference level. In order to provide compensation over a section of the telephone transmission path originating at a telephone instrument, without the requirement for additional equipment provided at the location of said telephone instrument, the standard tone sending device conventionally provided at such a telephone instrument may itself be utilised as the means for generating said tone signal. There is also described a telephone system enabling the establishment of a transmission path via a plurality of tandem connected telephone links, each established via a telephone switching system, provision for compensation of transmission losses being provided at a plurality of locations in said transmission path, in order substantially to reduce transmission losses throughout the system.

11 Claims, 5 Drawing Figures

COMPENSATION OF TRANSMISSION LOSSES IN A TELEPHONE SYSTEM

This application is a continuation-in-part of application Ser. No. 895,562, filed Apr. 12, 1978 now abandoned.

BACKGROUND OF THE INVENTION

This invention concerns improvements in and relating to the compensation of transmission losses in a telephone system.

In the public exchange system it is essential to provide for compensation for transmission losses due to attenuation of the transmitted signal over long distance trunk connections, and the sophisticated methods now in use for encoding transmitted signals on digital transmission systems and using pilot frequencies as references for measurement to allow appropriate compensation for the attenuation on analogue transmission channels are such that over any path that is connected over the major trunk network a substantially zero transmission loss can be achieved. However owing to the complicated and expensive equipment required for the compensation of such transmission losses, it has not hitherto proved economic to equip local line plant with such means for automatic transmission loss compensation and thus in any telephone connection there may be a significant variation of the transmission levels delivered to the local telephone terminals which derives mostly from the unknown loss over the local telephone lines.

Hitherto it has not been possible to provide economically for compensation of this latter transmission loss in the local network and only to control it to fall within acceptable limits by mandatory specification so as to be sufficiently low in relation to the prescribed level of the transmitted signal to provide an acceptable received signal level with acceptable cross-talk between channels under the worst case telephone connnection possible in the network.

However in response to a growing need for more sophisticated forms of telephone service an increased variety of telpehone line terminal equipments and services are to be expected in future development of the telephone system.

In spite of the variance in transmission loss to be expected over telephone connections such new services and facilities might be expected to include, for example, the need to couple existing local telephone terminals to other similar telephone line terminals so as to join together in tandem more than one telephone connection established via the public or a private telephone exchange network. This joining together may be by means of a private telephone exchange or other means or ancillary apparatus having the means to link two or more telephone connections in tandem so as to establish such tandem connection. In the circumstances of such tandem connections a cumulative transmission loss may arise due, for example, to the addition under "worst case" conditions of the respective transmission losses in the tandem telephone connections thus joined each of which under "worst case" conditions will, in the interests of telephone network economy, have been individually specified to permit the worst possibility of as high a transmission loss as can reasonably be tolerated alone.

In the "worst case" the total attenuation which can be experienced on such tandem connections will be the summation of the "worst case" conditions and the total can be expected to be too great to allow an acceptable level of communications.

In order to provide compensation for the transmission loss which occurs in such circumstances, and which is not capable of being assessed by the automatic transmission compensation means in the trunk circuits of the telephone system, it has been proposed to provide a customer controlled gain circuit which allows for the customer himself to vary the transmission gain in order to provide acceptable communication. Such an arrangement is described, for example, in U.S. Pat. No. 4,017,695. Such known arrangements, however, essentially depend upon the customer's assessment of the amplitude of transmitted signals and requires compensation of such signals by a trial and error method, wherein the customer repeatedly keys-in amplitude correction commands to vary the transmission gain until an acceptable level is reached. The operation of such a system is therefore not only tedious for the user, but requires a sophisticated understanding of the nature of the gain compensation required and an assessment of the gain of received signals, which may in any case not be derived from a source which provides a signal of consistent amplitude. Such a system, moreover, does not allow of the control of gain by the customer at a plurality of separate locations within the transmission path, such as may be necessary to provide appropriate gain compensation without exceeding the permitted level of signal at the output of an individual gain compensation amplifier.

SUMMARY OF THE INVENTION

It is accordingly an object of the invention to provide a simple means enabling automatic transmission loss compensation over that section of a telephone transmission path provided by equipment, such as a local telephone exchange, within which it has hitherto proved uneconomic to provide transmission loss compensation, without the need for evaluation of transmission losses by the customer.

A preferred object of the invention is to provide a means for transmission loss compensation which enables the setting up of a plurality of tandem-connected telephone links, whereby transmission losses in respective telephone links are individually compensated to substantially reduce transmission losses throughout the system and provide a loss-compensated transmission path suitable for a "conference" connection.

In accordance with the invention there is provided a method of compensating for transmission losses in a telephone system, comprising transmitting from a calling telephone station a multi-frequency tone signal of predetermined reference level derived from a tone sending device provided at said calling station, said tone sending device being of the kind intended for the purpose of sending separate control signals within the audible range capable of being transmitted from a calling to a called telephone station via the telephone speech path, for controlling supervisory functions of said telephone system, receiving said tone signal at a distant location connected to said calling station by way of a transmission path incurring transmission loss to be compensated, and adjusting the amplification factor of a variable amplifying means provided in the telephone speech path at said distant location in accordance with the difference between the level of said received signal and said predetermined reference level.

The method of the present invention thus takes advantage of the present trend towards the extensive use of key-button multi-frequency (M.F.) sending telephones and the adaptation of telephone exchanges to accept signals from these and the general acceptance of these M.F. signals on present day telephone networks for the setting and control of telephone connections.

In such key-button M.F. sending telephone terminals the call setting digits are not signalled by interruptions of the loop presented by the telephone terminal to the line by the dial to give so-called dial pulses but instead the key-buttons are used to send M.F. tones to line which are received by frequency responsive detecting equipment at the exchange which are commonly called M.F. receivers.

The tones most commonly used for this tone sending function are one out of a set of four relatively low frequencies together with one out of a set of three or four relatively high frequencies this latter choice depending upon whether 12 or 16 different frequency combinations are required through the equipping of the telephone terminal with a 12 to 16 button keypad. The M.F. tone signals used are within the normal telephonic speech band and are treated by the networks transmission path as if they were normal speech transmissions and will pass from "end to end" of a telephone connection with equivalent attenuation as if they were.

The level of these M.F. tones is controlled to lie within the commercially available limits inherent in the quantity production of such telephones so as to meet the telephone administrations requirements on the transmission levels that are permitted to be sent into the telephone network and give adequate signalling levels and are suitable to be used as the M.F. reference tone signals necessary for measurement of the attenuation of transmission paths.

Whilst these M.F. tone signals are being sent to line through the pressure of a keypad button the circuitry of the telephone terminal is arranged so that the connection of the microphone is inhibited so that noise or speech at the location of the telephone cannot interfere with the correct reception and interpretation of the M.F. tone signals being passed by the M.F. key-pad to the distant M.F. receiver. This isolation of the microphone serves to also preserve the integrity of the signal levels for accurate measurement in determining the attenuation of the transmission path up to the point of measurement.

Thus it will be seen that the already existing M.F. key-pad sending telephone terminal and the associated M.F. receivers already provided for the setting of telephone calls and/or other control purposes or additional M.F. receivers of a similar type but provided especially for the purpose of this invention, will together comprise a closely controlled signalling system for the conveyance of instructions but in which the M.F. tones themselves will also provide a reference signal standard whereby the otherwise unknown attenuation of the transmission path concerned can be measured and compensated by the provision of an appropriately adjusted amplifier path.

When the M.F. receiver responds to the presence of a M.F. signalling tone combination then it indicates the presence of such a signal which also indicates the disconnection of the microphone at the sending end so that the conditions are suitable for measurement and in those circumstances where it is wished to determine the transmission loss, this response of the M.F. receiver can be made to cause the connection of a level measuring means to the line so as to determine the level of the received signal thus providing a measurement of the attenuation of the connection against which appropriate adjustment is made of an amplifying means to restore this signal level to its original or other required value in suitable compensation of the transmission losses of all subsequent transmissions of both signalling tones and speech from that telephone terminal. The essence of the present invention therefore lies in the realization that the closely controlled M.F. signal passing between the M.F. tone sender/receiver combination provides an ideal medium for the measurement of transmission losses, and thus may serve an additional function not hitherto contemplated by those skilled in the art of telephone switching simply because the M.F. sender and receiver were provided with the specific purpose of performing switching functions, without the remotest consideration of any other possibility.

Another aspect of the invention therefore provides a telephone exchange switching system comprising a plurality of telephone subscriber lines each serving a telephone subscriber station equipped with a multi-frequency calling tone generator for sending encoded multi-frequency calling tones having a predetermined amplitude level, exchange switching means responsive to said encoded mutli-frequency calling tones for establishing a switched connection between calling and called telephone stations, and at least one gain compensation means located in a telephone transmission path provided by said system, said gain compensation means comprising a multi-frequency tone receiver adapted to respond to said multi-frequency encoded signals, a variable gain amplifying means provided in said transmission path, and signal level sensing means having an input connected to said transmission path and adapted to vary the gain of the said amplifying means in order to provide gain compensation dependent upon the level of a tone signal applied thereto, the said multi-frequency tone receiver being arranged to provide an output signal to actuate said signal level sensing means upon receipt of a predetermined multi-frequency encoded tone signal.

In accordance with one embodiment of the invention, the transmission path in which losses are to be compensated comprises a plurality of telephone links serially connected with a subscriber telephone exchange between each two adjacent links and serving both as a called station for a link established thereto from a calling station and as a calling station for a link established therefrom to a suceeding called station, and the compensation of said transmission losses is carried out in a plurality of stages at each subscriber telephone exchange. By means of this method, transmission loss compensation can be achieved over the whole of a transmission path established through a plurality of serially connected telephone stations, and thus, even if the individual telephone links are made via the public telephone exchange network and are subject to transmission losses in, for example, local line plant, the transmission loss compensation provided in accordance with the invention will enable communication between any and all of the telephone stations so linked, the signal level being maintained adequate for the serially linked telephone stations to be used effectively as a conference connection. Any or all of the individual telephone stations may itself be provided with conference facilities, so that additional conferees may be added. It is believed that the method of transmission loss compensation in accordance with the invention uniquely renders possible the provision of such a conference connection facility, as no known method of transmission loss compensation would be effective over a plurality of serially connected telephone links each of which may involve an unknown transmission loss.

In the provision of any new telephone services it is important that as far as is possible these should not require the application of new signalling conditions to the exchange system, especially existing exchange systems and extra especially any public exchange system where such new conditions might interfere with the proper working of its traditional functions and will in any case restrict the signalling possibilities available for further future adaptations of perhaps greater need.

It is thus also an important feature of employing the existing M.F. keypad signalling tones already agreed and catered for by most telephone administrations for connection to the exchanges of their existing networks, for measurement of the attenuation and its compensation in accordance with this present invention, that such measurement of M.F. tone signals on the connection either during or subsequent to its setting, does not introduce any extra signal or condition to the network that would not or may not in any case be applied there, so as to be quite unobjectionable against any fear that the traditions of its operation might be affected in any way.

However, in may existing telephone services, the actuation of ancillary attachments of equipment at exchange line terminals is dependent upon the fact that the originating subscriber having a M.F. keypad telephone terminal can signal through the telephone connection from end to end, once the speech path is established, in order to provide command signals for the operation of the ancillary attachments. In accordance with a further preferred feature of the method of the invention, such a facility is taken advantage of to provide that the said stages of loss compensation are carried out at each called telephone station in turn, proceeding in the direction of transmission from the calling telephone station originating the first of the serially connected links, a tone signal from the latter calling telephone station being used for all stages of loss compensation, said signal being transmitted to each called station via any preceding telephone station in the transmission path and the compensated transmission path established to the latter.

An apparatus for use in the method of the invention may comprise a multi-frequency tone receiver of the kind adapted to respond to multi-frequency tone signals within the audible range capable of being transmitted via the telephone speech path from a calling to a called telephone station, in order to control switching functions in a telephone system, a variable gain amplifying means provided in said transmission path, and signal level sensing means having an input connected to said transmission path and adapted to vary the gain of the said amplifying means in order to provide gain compensation dependent upon the level of a tone signal applied thereto, the said multi-frequency tone receiver being arranged to provide an output signal to actuate said signal level sensing means upon receipt of a predetermined multi-frequency encoded tone signal.

Athough particularly suitable for the provision of gain compensation in junctors linking telephone connections forward in tandem or the joining of telephone connectins to functional items equipped at the periphery of the network where a close control of transmission level is desirable, the present invention is also applicable to the compensation of transmission channels within the telephone network itself so as to improve its transmission characteristics or to retain the present standards with an otherwise unacceptable degradation of the line plant specifications.

In such an application apparatus in accordance with the invention may comprise a pair of hybrid circuits spaced apart in the transmission path provided by said apparatus and separating the portion of said transmission path intermediate said hybrid circuits into two unidirectional transmission channels, each said channel incorporating a variable gain amplifying means and having connected thereto a separate multi-frequency receiver and signal level sensing means.

Alternatively, when apparatus in accordance with the invention is used for the provision of gain compensation in junctors linking telephone connections forward in tandem, it may be undesirable to provide amplification of the outgoing signal applied to a telephone exchange line in the return direction, owing to possible overloading of the exchange line by the application of signals of a magnitude above that permitted by the administration. Thus in accordance with a further embodiment of the invention, the apparatus may incorporate a pair of hybrid circuits spaced apart in the transmission path provided by said apparatus and separating the portion of said transmission path intermediate said hybrid circuits into two unidirectional transmission channels, and having an amplifier provided only in one channel of said hybrid circuit, for compensating transmission losses. This enables the provision of gain compensation in the receiving direction, the return direction being unaffected.

In a particularly advantageous embodiment of the invention incorporating this arrangement, there is provided a telephone exchange system including a conference bridge providing for communication between its respective ports with substantially zero transmission loss; at least one incoming exchange line capable of connection to a port of said conference bridge; at least one outgoing exchange line capable of connection, via said conference bridge, with an incoming exchange line; a pair of hybrid circuits spaced apart in a transmission path between each incoming exchange line and the conference bridge in order to separate the part of the transmission path between said hybrid circuits into two unidirectional transmission channels; and amplifying means located in the unidirectional transmission channel effective in the direction of transmission towards said bridge; a variable attenuation means located in a bidirectional part of said transmission path; means for sensing the level of a tone signal received via said incoming exchange line and providing an output signal to vary the attenuation of said attenuation means in accordance with the level of the incoming tone signal; means responsive to a said tone signal for actuating said level sensing means; a second pair of hybrid circuits spaced apart in a further transmission path between each outgoing exchange line and the conference bridge in order to separate the part of said further transmission path between said second pair of hybrid circuits into two further unidirectional transmission channels; and an amplifying means located in said further unidirectional transmission channel effective in the direction of transmission towards said bridge.

Further features, objects and advantages of the invention will become apparent from the following description taken in conjunction with the appended Claims.

DETAILED DESCRIPTION OF PREFERRED EMBODIMENTS OF THE INVENTION

Figure 1:
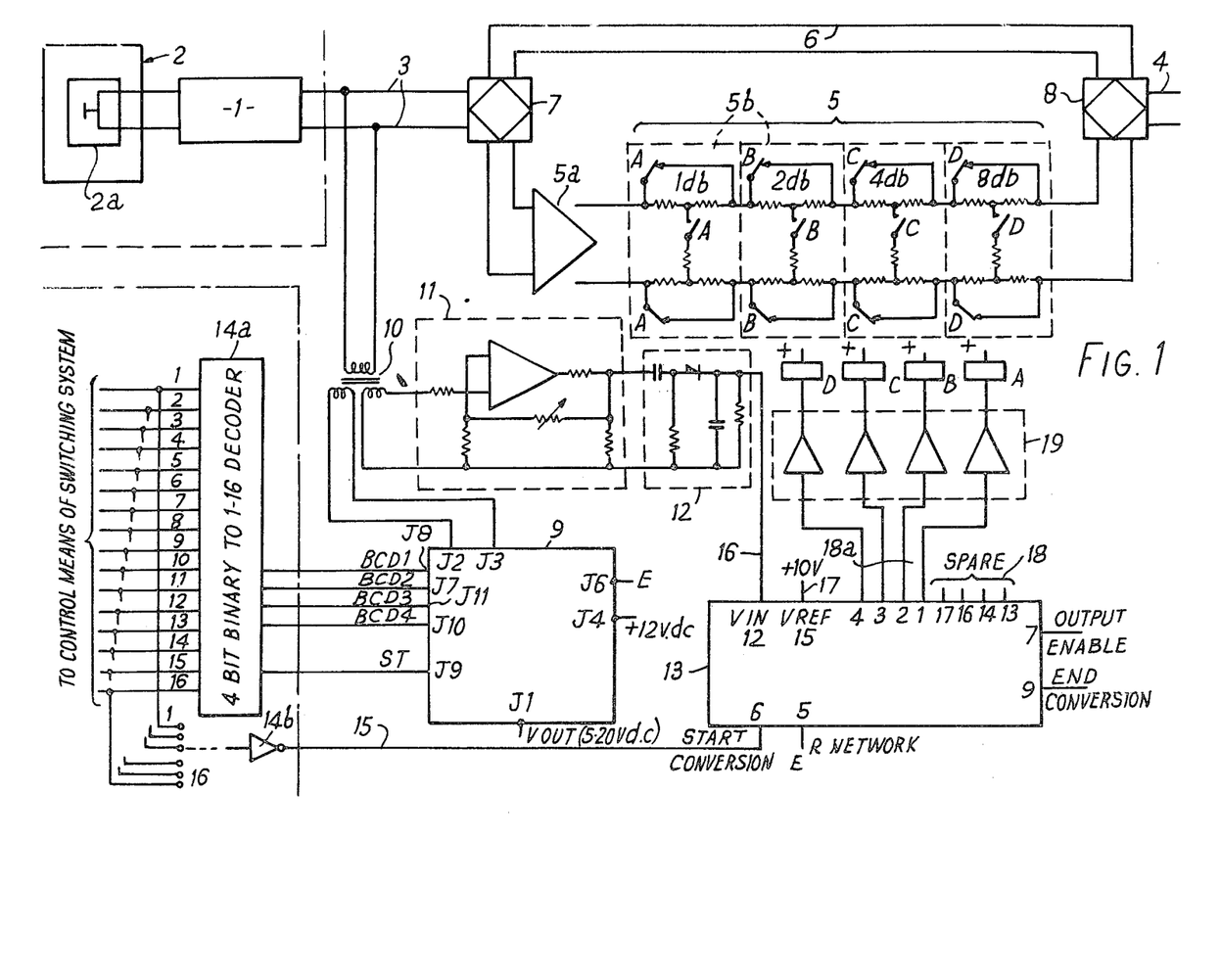
FIG. 1 is a block diagram of one embodiment of apparatus in accordance with the invention for providing transmission loss compensation.

Referring to FIG. 1 of the drawings, there is shown a telephone exchange switching system incorporating a junctor providing for transmission loss compensation. The system may comprise a private or public telephone exchange switching system or any equipment which is provided with the facility of connecting in tandem telephone transmission paths established via two exchange lines of a public or private telephone switching system. As shown in the drawing, a public or private telephone exchange 1 is arranged to provide a connection between originating telephone stations served by the exchange, of which one is indicated diagrammatically at 2, and the junctor referred to above. The junctor comprises terminal 3 for connection to a line of the public or private telephone exchange indicated at 1, a terminal 4 for connection through the public or private exchange or other ancillary equipment to another exchange line of the private or public exchange, not illustrated in further detail, a 'GO' variable gain amplifier path 5 provided in the transmission path between terminals 3 and 4 and a zero loss 'RETURN' path 6 served by hybrids 7 and 8. An M.F. receiver 9 of conventional type is coupled to the terminals 3 via a transformer 10 and provides a series of outputs 9a upon which binary coded output signals are marked in known manner in response to coded multi-frequency tone signals applied at the input to the M.F. receiver 9, and an output 9b which indicates the presence of valid signal information on the outputs 9a. M.F. receivers of the kind referred to are well known and will not be described herein in detail. A suitable M.F. receiver is, for example, receiver module No. CM 8834 marketed by MITEL Telecom Limited of Berkshire, England. Such an M.F. receiver is adapted to respond to coded combinations of high and low audible tone transmitted by the telephone speech path, and to provide in response thereto a binary coded output signal on the outputs 9a which is indicative of a dialled digit or other code signal transmitted from an M.F. tone generator 2a provided at a calling telephone station 2. The M.F. tone sender 2a is also of a well known type and is adapted to generate, in response to depression of a corresponding push button of the telephone keypad, not shown, an appropriate multi-frequency encoded signal which comprises a specific combination of high and low tones. Such a tone generating circuit is adapted, in response to depression of a corresponding keypad button, to disconnect the microphone circuit at the calling telephone station, in order to eliminate extraneous noise on the signalling path between the generator 2a and the receiver 9, and to generate the required combination of high and low audio tones capable of being transmitted over the telephone speech path. A suitable tone generating circuit is, for example, described in British Patent Specification No. 1,279,333, corresponding to U.S. Patent Application Ser. No. 225,440 filed Feb. 11, 1972, now U.S. Pat. No. 3,761,642. The disclosure of Patent Specification No. 1,279,333 and the U.S. patent are incorporated herein by reference, and accordingly further discussion of the detail of the tone generating circuit 2a will be omitted. Suffice it to say that the connection between the tone generating circuit 2a and the tone receiver 9 established via the exchange switching system 1 provides a closely controlled signalling system in which the tone generator 2a provides an audio output having a peak amplitude providing a predetermined reference level and the receiver 9 is adapted to respond only in the presence of an output from the tone generator 2a and an absence of other extraneous noise on the telephone line connected thereto.

Also coupled to the terminals 3 via the transformer 10 is a variable gain amplifier circuit 11, the output of which is connected via a rectifying and integrating circuit 12 to a signal input of an analogue to digital conversion circuit 13. The outputs 9a of the M.F. receiver 9, together with the output 9b, are connected via an appropriate logic circuit 14, including a binary to sixteen output decoder 14a and an inverter 14b, to a control input 15 of the analogue to digital conversion circuit 13. The decoder 14a is arranged to provide, in response to the binary coded signals on the outputs 9a together with the validity signal on output 9b, corresponding output signals upon its sixteen outputs which respectively represent the digits or other signals designated by the push buttons of the telephone instrument at the calling station 2. The inverter 14b is strapped to a single output of the circuit 14a, and thus, upon depression of the corresponding push button at the calling station 2, an output signal is transmitted to the input 15 of the analogue to digital conversion circuit 13 in order to activate the latter.

The analogue to digital conversion circuit 13 is of well known type, and may for example comprise an analogue to digital converter as marketed by National Semiconductor Corporation under Serial No. ADC 0800, as described in the National Semiconductor Data Acquisition Handbook 1977 Edition, pages 27 to 32. The circuit 13 is adapted, upon receipt of a command signal at the control terminal 15, to compare the input voltage at terminal 16, with a reference voltage applied at terminal 17, and to provide at output terminals 18 a binary coded signal representative of the measured voltage. As shown in FIG. 1, the four most significant outputs 18a of the analogue to digital converter are connected via corresponding buffer amplifiers 19, to respective relays A, B, C, D. The relays A to D control correspondingly referenced contacts in respective attenuator pads 5b, the attenuation values of which are arranged to provide cumulative attenuation from 1 to 15 dB in response to corresponding binary coded outputs on the leads 18a. A fixed gain amplifier 5a is arranged to provide a corresponding 15 dB gain, so that when all of the attenuator pads 5a are switched into series with the amplifier 5a then there is a resultant zero gain.

The operation of the circuit illustrated in FIG. 1 will now be described in more detail. It will be assumed that a connection has been established from a calling telephone exchange line terminal 2, by means of calling tones transmitted from the generator 2a, via the public or private exchange system 1, to the terminals 3. It will also be assumed that a switching system, not illustrated, and associated with the decoder 14a is adapted to perform further automatic switching operations in accordance with tone signals transmitted forward from the calling telephone station 2 over the exchange 1, to terminal 3 which are received and decoded by the M.F. receiver 9 and provided as corresponding output signals, via the decoder 14a, to the switching system not further illustrated. Such a switching system may, for example, be of the kind described more fully in my copending U.S. Patent Application Ser. No. 948,271 filed Oct. 3, 1978. Suffice it to say that the switched configurations of transmission path capable of being set by the switching system, which are referred to in more detail with reference to FIG. 5 below, require the provision of compensation for transmission losses between the calling telephone station 2 and the terminal 4. The remote caller at the telephone station 2 may call for adjustment to the gain of the amplified transmission path 5 to compensate for transmission loss in his transmission path to terminal 3, by transmitting an appropriate encoded M.F. signal via the push button keypad at the telephone station 2. In response to the corresponding M.F. signal transmitted from the tone generator 2a, the M.F. receiver 9 will provide a corresponding encoded output signal on the terminals 9a, together with a validity signal on output 9b. These output signals are gated within the logic circuit 14 to provide a corresponding output to the control terminal 15 of analogue to digital converter 13. The same multi-frequency signal received by the M.F. receiver 9 is received, via transformer 10, at the input to the adjustable amplifier 11. The output from amplifier 11 is rectified and integrated to provide a signal voltage representative of the peak value of the incoming signal provided by the combination of high and low frequency tones, and this peak value signal is applied from the output of circuit 12 to the input 16 to the analogue to digital converter 13. The analogue to digital converter 13 is adapted to compare the signal at terminal 16 with a reference signal provided at terminal 17 corresponding binary encoded output signals on outputs 18, which is a measure of the amplitude of the incoming signal applied at terminal 16.

It should be noted that the M.F. tone generator 2a is constructed to provide the multi-frequency output signal at a specified peak amplitude determined by the relevant telephone administration. The amplitude of this signal therefore provides a reference standard against which the amplitude of the signal received at terminal 3 may be compared to obtain a measure of the transmission loss between the calling telephone station 2 and the terminal 3. The adjustable amplifier 11 is initially set to a predetermined amplification factor such that when the input signal received thereby corresponds to the reference standard provided by the output signal of the tone generator 2a, i.e. when there is zero transmission loss between the calling telephone station 2 and the terminal 3, it provides an output signal which has a peak value such that the output voltage of the circuit 12 corresponds to the reference voltage applied at terminal 17. This is the extreme value of the voltage range capable of being measured by the analogue to digital converter 13, and therefore the outputs on terminals 18a cause all of the attenuator pads 5b to be switched into the transmission path 5 so that the net amplification factor provided over the transmission path 5 is zero. Conversely, an input signal at terminal 3 which is of lower amplitude in comparison with the said reference value will cause the circuit 13 to provide a digital output below the extreme value, and the lower value of the corresponding attenuator pad or combination of attenuator pads 5b switched into the transmission path 5 will result in the application of a positive amplification factor such as to compensate for the transmission loss between the calling telephone station 2 and the terminals 3.

Thus, it will be seen that in a simple manner there has been provided a means for compensation of the transmission loss in a telephone switching system by utilising the characteristics of the known M.F. tone generating circuit 2a and tone receiving circuit 9, hitherto provided solely for the purpose of controlling telephone switching functions. It should be noted that the analogue to digital converter 13 is of a kind such that the readout signal provided on the outputs 18 is held in output latches until receipt of a further control signal at the control terminal 15 to initiate a further analogue to digital conversion. Thus, following adjustment of the gain compensation of the telephone junctor by means of a transmitted M.F. tone signal, this compensation is retained at the adjusted level until a further compensation operation is initiated by transmission of a further signal. Since the attenuation characteristics experienced over local telephone lines, as opposed to the trunk network, tend to remain relatively constant, the compensation thus provided, for example at the initiation of a telephone call, will generally prove sufficient for the duration of the call.

Various alterations may be made to the arrangement illustrated in FIG. 1, without departing from the scope of the invention as defined in the appended claims. For example, it will be noted that in the circuit illustrated, the transmission compensation provided by the amplified telephone junctor is initiated in response to transmission of a specific encoded signal corresponding to a push button of the calling telephone station 2. Such compensation will, therefore, be initiated each time that this button is actuated. If it is required that the operation of the circuit 13 be made subject to the supervisory control of an automatic control system, then the control input 15 to the circuit 13, instead of being derived directly from the binary to sixteen output logic circuit 14, may be derived from a common control of the telephone switching system which is itself responsive to outputs from the circuit 14.

It will be noted that the arrangement of FIG. 1 provides only compensated amplification in the 'GO' direction, away from the originating subscriber, this being the primary requirement as will be understood from the description below with reference to FIG. 5.

Figure 2:
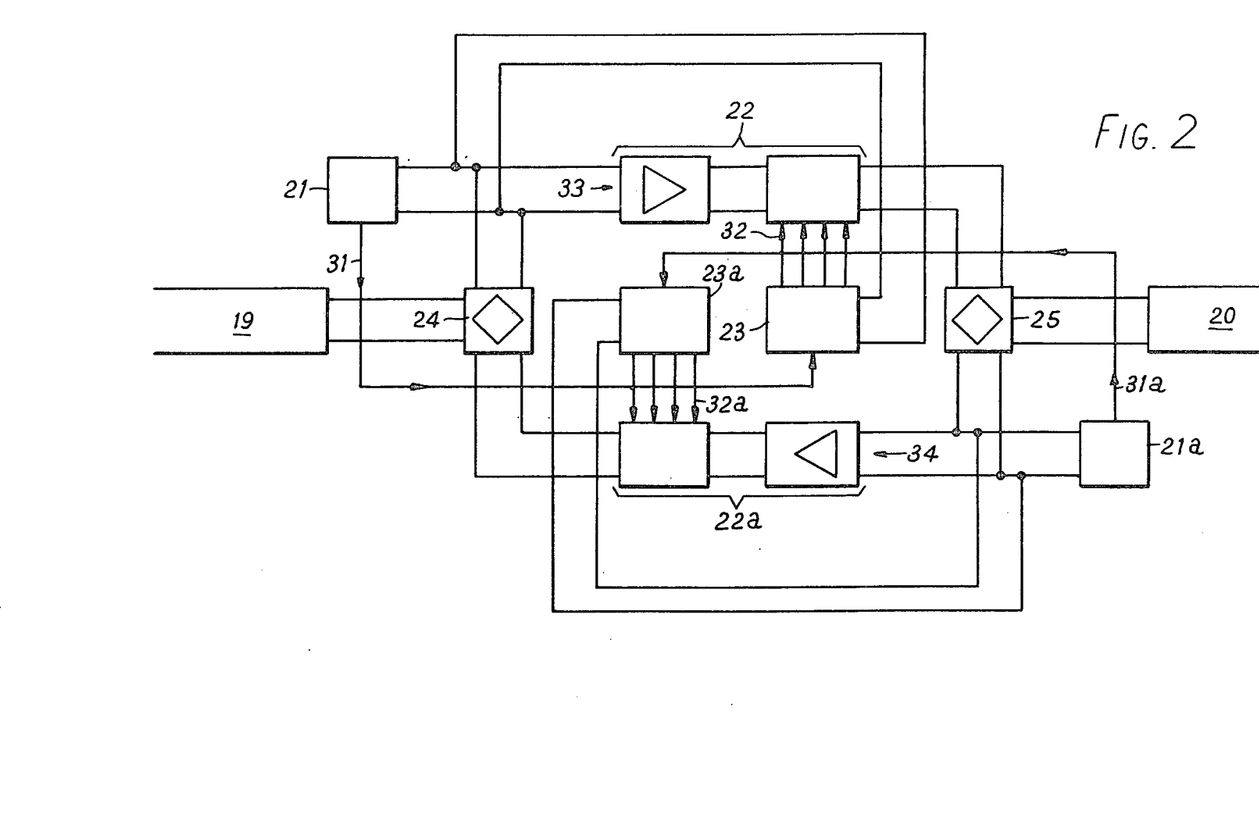
FIG. 2 is a block diagram of another embodiment of apparatus in accordance with the invention for providing transmission loss compensation.

However, the compensation provided by the junctor of FIG. 1 may be repeated in the return direction, as shown for example in FIG. 2. Referring to FIG. 2, it will be seen that the compensated amplified both way junctor arrangement shown, takes the form of a typical telephone repeater with hybrids 24 and 25 to separate the 'GO' and 'RETURN' directions of transmission into two isolated paths 33 and 34 joining the both-way transmission paths 9 and 10 so as to be able to include in these isolated paths 33 and 34 the adjustable gain paths 22 and 22a with their associated M.F. receivers 21 and 21a and associated signal level measuring equipment 23 and 23a respectively. Unless there are other control functions to perform the M.F. receivers can be rudimentary responding only to the M.F. keypad type signal tones of the digit allocated to this purpose and if the transmission paths 19 and 20 each comprised a separate 'GO' and 'RETURN' path as is common in telephone networks then the hybrids 24 and 25 would be redundant.

Differences between the arrangement of FIG. 1 and FIG. 2 arise mostly through the assumption that that of FIG. 1 would be applied in a junctor with an associated functional equipment as well as the capability of forwarding the connections to a following tandem junctor and that this associated functional equipment would possess a control structure which through the G1 gate and command lead 12 would wish to exercise control over the application of the measuring means 9 in compensating the gain of FIG. 1. In FIG. 2 the assumption is that the junctor shown is merely a forwarding stage with no control needs or complex capabilities and is relying entirely upon the M.F. receivers 21 and 21a to connect the level measuring means 23 and 23a to set the gain of the adjustable gain path 22 and 22a respectively when the M.F. keypad tone frequency is present from the appropriate end to actuate the M.F. receiver 21 or 21a which ever is appropriate to the direction from which the M.F. keypad tone serving as a reference for the compensatory measurement, is being applied. If M.F. keypad tones are applied simultaneously from both transmission paths 19 and 20 then both the adjustable gain paths 22 and 22a will be set simultaneously justable gain paths 22 and 22a will be set simultaneously by the markings on the read out leads 32 and 32a from the signal measuring means 23 and 23a.

In considering the operation of the device described above it will be assumed that the working of the hybrids 24 and 25, in reducing the return loss of such a typical telephone amplified repeater, is well understood and that the purpose of these is to provide a good 'return loss' between the two adjustable gain paths 22 and 22a so that the input of 22 at 33 receives signals only from transmission path 19 and the input of 22a to 34 receives signals only from transmission path 20 so that devices 21, 22 and 23 respond only to signals from transmission path 19 towards transmission path 20 via path 33 whilst devices 21a, 22a and 23a respond only to signals from transmission path 20 towards transmission path 19 via path 34. Thus an M.F. keypad tone signal from transmission path 19 will be detected by the M.F. receiver 21 which will give out a signal on lead 31 to activate the signal measuring equipment 23 to measure the level of the signal detected by the M.F. receiver and then provide a read out to set the adjustable gain path 22 to compensate for the attenuation of the transmission path 19 as in FIG. 1. A M.F. keypad tone signal from transmission path 20 will in an identical fashion set the adjustable gain path 22a by the action of similar devices 21a, 23a to compensate the losses of transmission path 20.

In considering the bi-directional compensation provided by the arrangement of FIG. 2, it has been assumed that M.F. tone signals can be made available from both ends of the junctor during any given call connection. For example, both calling and called parties may actuate tone sending devices by arrangement. Alternatively, the automatic control means of a called terminal could be made to send back to the calling terminal a burst of a M.F. tone upon seizure which will then serve for initiating gain compensation in the return direction.

Figure 3:
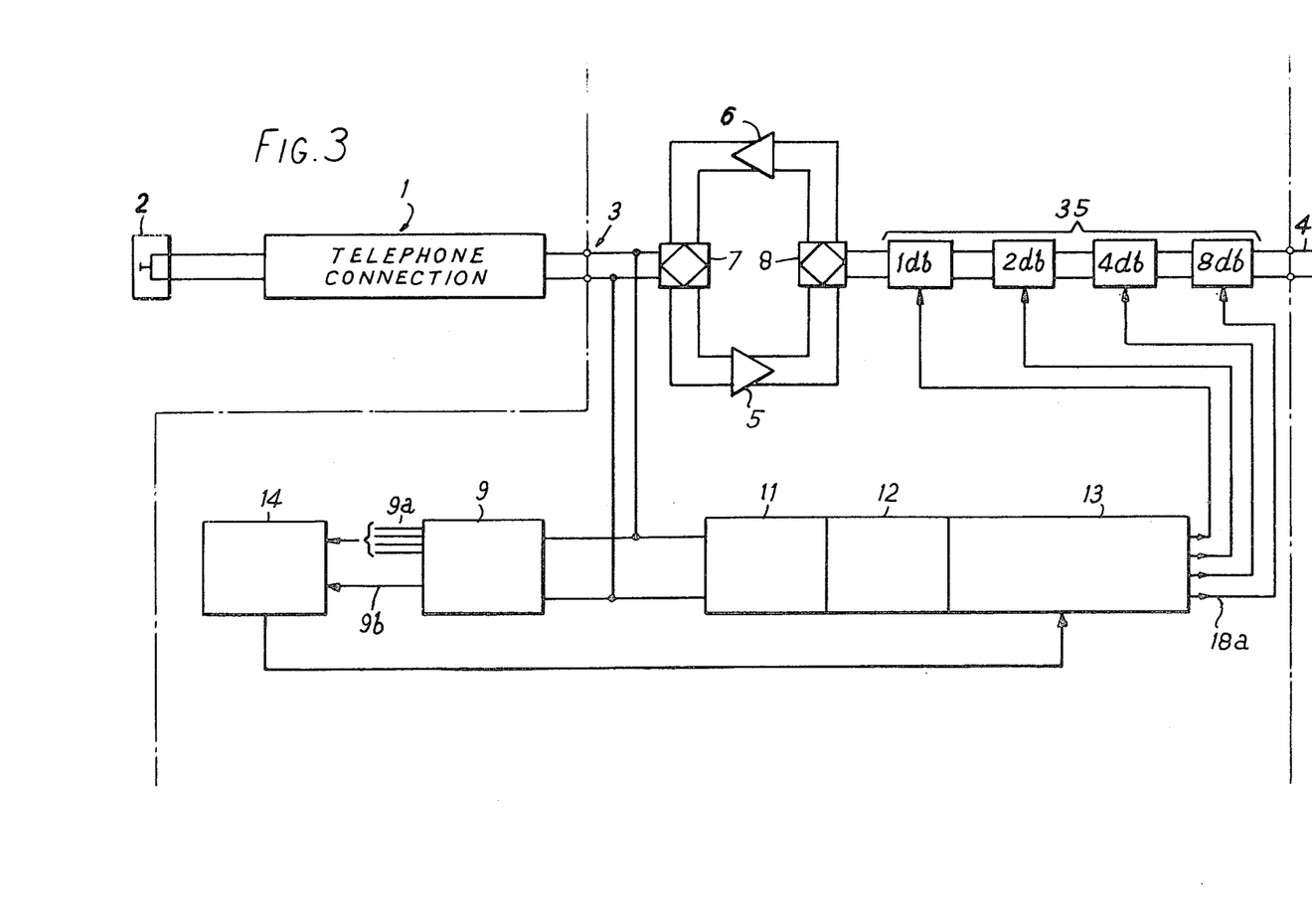
FIG. 3 is a block diagram of a further embodiment of apparatus in accordance with the invention for providing transmission loss compensation.

However, it may be inconvenient to rely upon the availability of tone signals in the return direction, due for example to the reluctance of telephone administrations to allow the application of such signals at the return end. In this instance, upon the assumption that the return loss will be substantially the same as in the 'GO' direction, the apparatus of FIG. 1 may be modified to provide compensation in both directions upon the basis of a single tone measurement in the 'GO' direction. Such an arrangement is shown in FIG. 3 in which the 'GO' and 'RETURN' paths 5 and 6 are both provided with fixed gain amplifiers and an adjustable attenuator 35 is provided in common to both paths. The operation of the arrangement is otherwise identical to that of FIG. 1, the circuit 13 serving to provide variable attenuation and thus variation of the effective amplification factor of both transmission paths.

Figure 4:
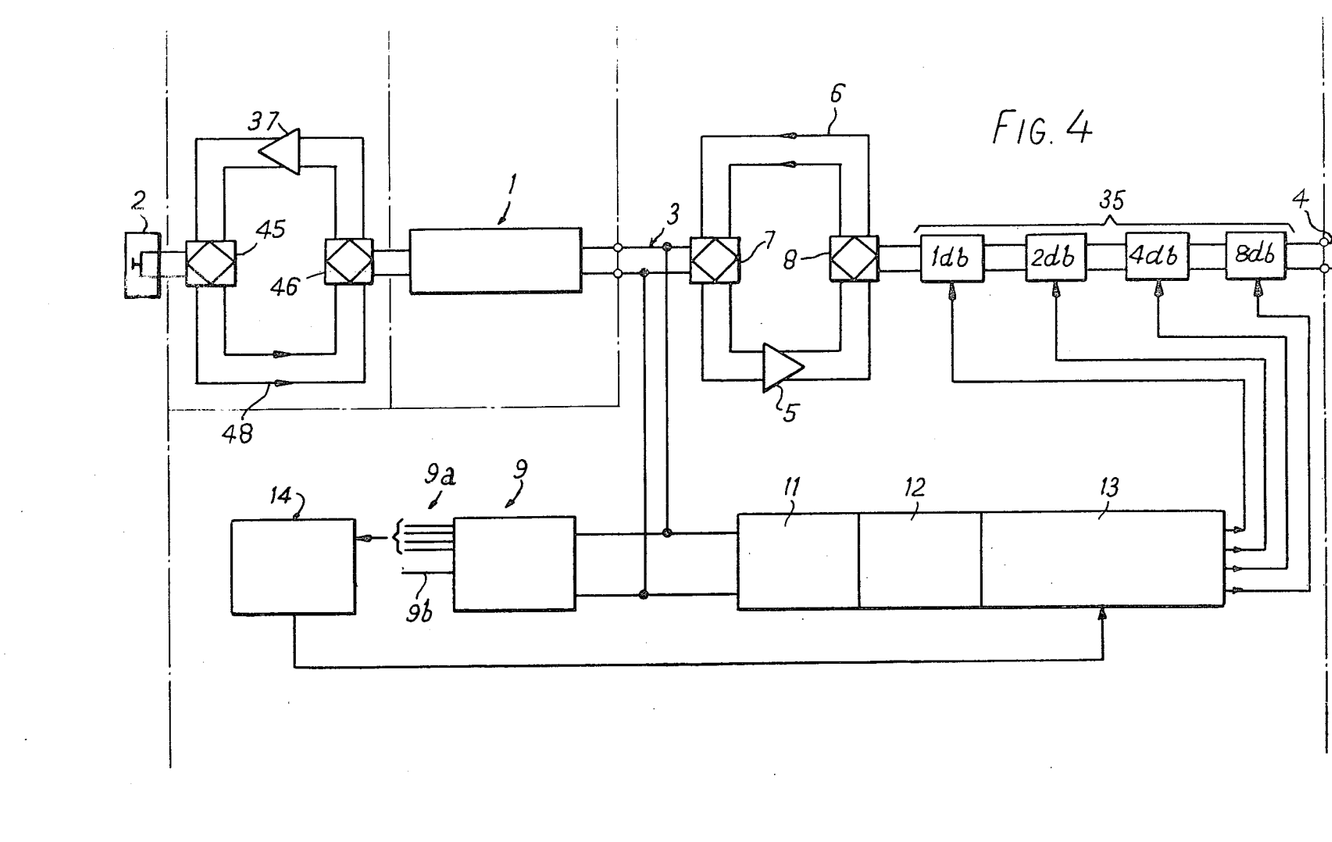
FIG. 4 is a block diagram of yet a further embodiment of apparatus in accordance with the invention for providing transmission loss compensation.

In some circumstances overload may occur in the return direction with the arrangement of FIG. 3, due for instance to a following tandemly connected channel being of low attenuation or being compensated to appear so and the channel in question being of high loss so as to call for a high amplification from the both-way gain path. FIG. 4 shows an arrangement for overcoming this problem. The arrangement is identical to that of FIG. 3, with the exception that the fixed gain amplifier of the 'RETURN' path 6 is removed and remotely located at the output of the 'RETURN' path of the transmission channel of the telephone connection 3. The amplifier 37 is in this case provided with its own hybrid repeater configuration designated 45, 46 and 48 in this location, at the output of the transmission channel rather than the input, its gain is unable to cause the transmission level to exceed that allowed for connection to the network.

Figure 5:
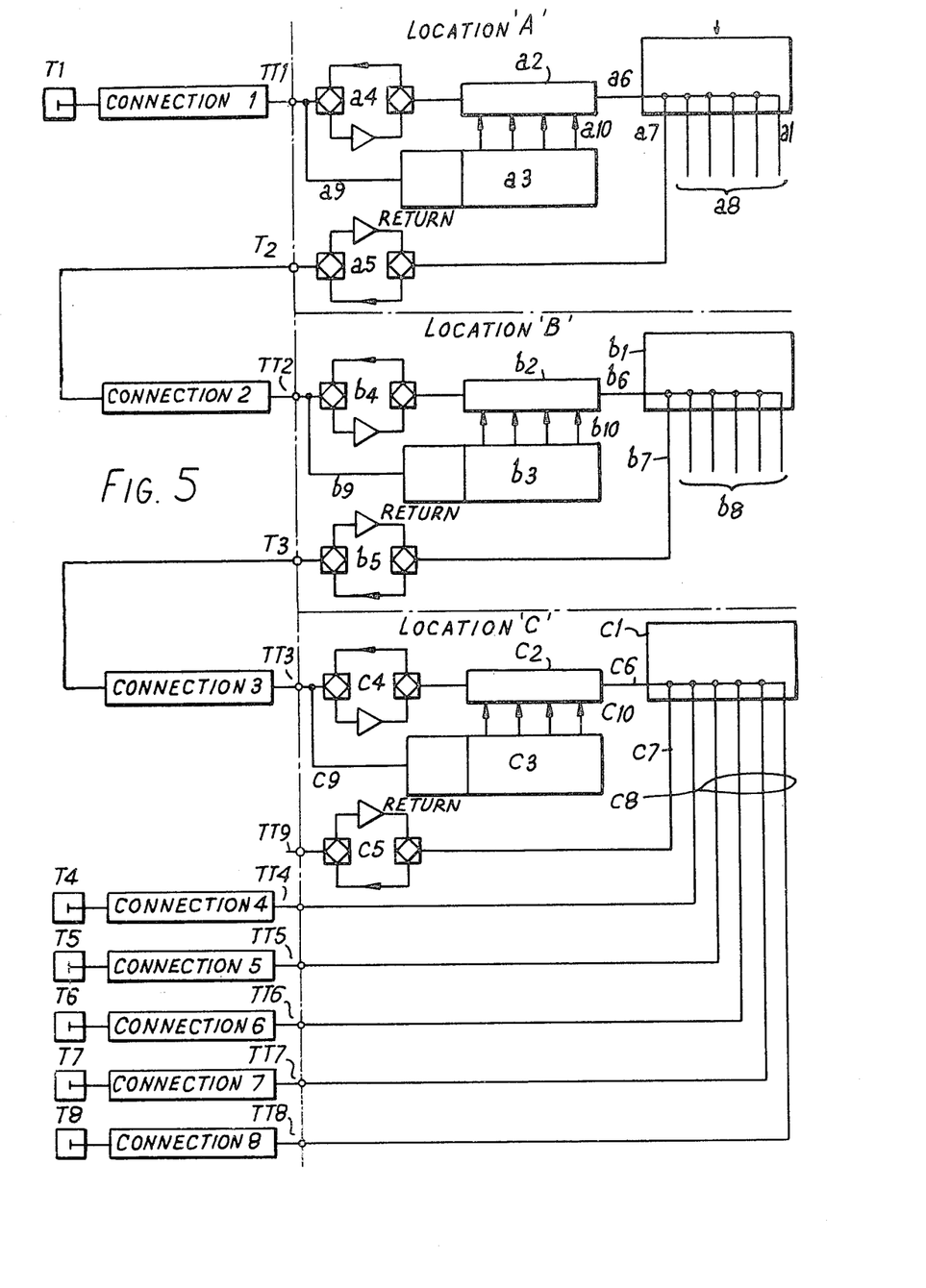
FIG. 5 is a block diagram illustrating a telephone transmission path incorporating a plurality of tandem connected telephone links, each including apparatus in accordance with the invention for providing transmission loss compensation.

Referring now to FIG. 5, there is shown in block diagram form a tandem linking of telephone connection paths compensated in the manner described above which serve to join a number of telephone conference bridges in different locations together. It should be noted that the tandemly linked connection from the originating subscriber T1 passes through all of the conference bridges a1, b1, c1 which are separately amplified so as to impart no transmission loss to this connecting path due to the conference interconnection made there. Such a conference bridge is designed to give a zero loss interconnection between each and all telephone connections made to its ports.

Considering FIG. 5, in conjunction with FIGS. 1 and 4, it will be seen that the subscriber T1 is connected via a first telephone connection with a terminal TT1 of a telephone station provided at location A, and incorporating the conference bridge a1, the telephone station being provided, in a manner not described in further detail, with facilities for the connection of the terminal TT1 via the conference bridge a1 with an outgoing exchange line T2 via which the subscriber T1 may be linked in tandem, for example through the public exchange network, with an incoming terminal TT2 of a further telephone station at location B, and incorporating a conference bridge b1. Likewise, a further connection may be established via the outgoing terminal T3 of telephone station B to a further telephone station at location C. In addition to the tandem linked connections between the respective telephone stations at locations A, B and C, the subscriber T1 may establish conference connections to any number of further subscribers via each of the conference bridges a1, b1 and c1, and may also, if desired, extend the serially connected telephone links beyond the location C by seizing a further outgoing exchange line. It will be appreciated that the telephone switching system providing for the establishment of the switched route structure illustrated in FIG. 5 does not itself form part of the invention, and is illustrated diagrammatically to show the utility of the transmission loss compensation apparatus in accordance with the invention. However, for a more detailed disclosure of the command and control structure for the establishment of a switched connection such as shown in FIG. 5, reference may be made to my copending U.S.A. Patent Application referred to above.

Considering the transmission paths shown in FIG. 5, it will be shown that between the terminal TT1 and the port a6 of the conference bridge a1, there is provided a transmission loss compensation arrangement constructed as described in FIG. 1, and providing compensation only in the direction of transmission from the subscriber T1 towards the conference bridge a1. Between each of the serially linked conference bridges, on the other hand, the transmission loss compensation arrangement has the construction as described in FIG. 4, due to the inclusion at each telephone station of a fixed gain amplifier in the return path of each outgoing exchange line, as shown at a5, b5 and c5. Thus, the tandem connections between the conference bridges are all fully compensated in both directions to provide zero transmission loss. It will further be noted that those ports of the conference bridges which are directly linked via terminating connections to telephone subscribers such as shown at T4 to T8, include no compensation for transmission loss.

Thus the originating telephone connection is compensated to give zero loss only in the 'GO' direction away from the telephone and is subject to transmission loss in listening whilst all terminating subscribers which are the conferees that have been gathered onto the various conference bridges at the different locations are uncompensated 'GO' or 'RETURN'. Thus all conferees in the different locations are similarly interconnected through the transmission loss of two telephone connections and the 'GO' direction of the originating and controlling subscriber who is also a conferee is compensated to be of zero loss guaranteeing him the best possible conditions through which to control the conference, through both speaking and M.F. keypad signalling.

These originating and terminating connections to the conferees are most probably made through private telephone networks, which, being at the extremity of the natural transmission plan of the public network, can be expected to have low transmission loss and it is through this factor that the series connection of two such uncompensated connections is tolerable on such telephone conferences.

The manner in which a subscriber at terminal T1 obtains transmission loss compensation throughout the conference connection established as shown in FIG. 5, with the exception of those uncompensated paths already referred to, will now be described in further detail. The originating subscriber, who may be a telephone operator, or other source of connection, will be equipped with a telephone terminal capable of M.F. keypad control and also a dial, if the exchange to which he is connected is able to respond to only dial pulse control of call setting.

The originating subscriber at terminal T1 calls for the service he requires, in this case a conference service, by dialling or keying the allocated access digits on the exchange to which he is connected, making a telephone connected to the terminal TT1 at location A, where the connection is made through to the functional equipment, in this case the amplified conference bridge, a1 via the lead a6.

The originating subscriber will now use the M.F. keypad to cause the control equipment associated with the conference bridge to make telephone connections a8 to the conferees if it is wished to join the conference at location 'A', one of which connections will be to the port a7 and via the 'RETURN' amplifier equipment a5 and so to terminal T2 which will probably be on the same exchange system as terminal TT1 to seize and make connection 2 to terminal TT2 on the location B which will most likely be remote from location A.

In this action the originating subscriber T1 will have sent M.F. keypad digits which will have been received via lead a9 by the M.F. receiver and level measuring device a3 and as described with reference to FIG. 1, the adjustable attenuator a2 will be set in compensation of the transmission loss of the 'GO' direction of connection 1, provided by the fixed amplifier in hybrid a4. Thus the connection forward from T1 to T2 will be of zero loss and signals passed forward to that point from the T1 terminal will appear at T2 for passing forward to TT2 and perform further call setting functions there at location B which are similar to those already performed at location A and described above, without indication having been passed to location B that it is not the first connection in the tandem chain of FIG. 5.

As part of these call setting actions at location B there will be the setting of connection 3 to location C as connection 2 was set to location B and location C will again have the conditions from T1 passed to it as if directly from T1 and without indication that it is not the first conference centre location in the tandem connection of FIG. 5.

Exercising identical control and processes to those used at location A and later at location B the T1 originating subscriber will now set the required connections 4 to 8 to conferees at the subscribers' terminals T4 to T8 in the mode of ordinary terminating telephone connections so that these subscribers are connected together in conference via the conference bridge at location C with the attenuation of their two uncompensated telephone connections between each and all other parties.

The conference connections at locations A and B are joined similarly to their respective conference bridges and these bridges are joined together by the zero loss compensated telephone connections 2 and 3 to give a combined conference, spanning all the conferees at all the locations A, B and C with the similar attenuation of only the two uncompensated connections joining each conferee to all other conferees, excepting the originating subscriber who is connected to each other conferee by only the attenuation of the respective conferees lines through having the attenuation of his 'GO' channel to the conference bridge at the location A compensated to zero loss by the a4 'GO' amplifier and adjustable attenuator a2 at location A.

It will be seen that applying the invention in this way with the transmission level measurement made only in reference to the 'GO' channel and location of the 'RE- TURN' fixed gain amplifier to the output of the 'RETURN' path, where it cannot overload the input of the transmission path and is convenient of omission on the originating connection 1 of FIG. 5, gives a very convenient, simple and economic solution to the problem of compensating the transmission losses in the linking of functional units such as conference bridges together by tandem telephone connections and how with suitable arrangement and design the invention can be applied to many specialised, as well as many general purpose applications, many of which will be best served by avoiding the need for M.F. keypad signals or other reference tones to be made available from the terminating end of the tandem connection.

Various modifications and alterations may be made to the embodiment of the invention described above without departing from the spirit and scope of the invention. For example, T.D.M. transmission systems encode the speech signals so that the transmission level is part of the encodement and the speech will be reproduced at the nominal level of reproduction irrespective of the level of signal attenuation in the transmission media provided of course that the digital signals are adequately received. Thus signal level compensation as provided for in this invention is not required in the path of such transmission and is correspondingly less important so that it might be assumed that it has no useful contribution to make to such systems.

However the invention can be directly applied as has been described to give signal level compensation from the keypad M.F. telephone so overcoming the attenuation of any analogue speech transmission path used to access the T.D.M. transmission equipment thus conferring advantage on the way in which the full span of the encodement equipment can be used to code up the speech waveforms and give a higher quality of reproduction than is possible when the encodement equipment has to deal with an unknown signal level which can vary in accordance with the permissible range of attenuation of the analogue channel.

This is very apparent and it might be assumed that such compensated amplifiers would be located as part of the analogue speech network and have no effect upon the design of the P.C.M. terminal and encodement equipment. However very convenient arrangements are known whereby M.F. key button signals can be recognised in terms of their coded P.C.M. patterns and the numerical value of these digitally coded patterns is a direct digital reading of the signal level presented to the encoder circuit and thus represents all the information necessary for compensated adjustment of the span of the encoder or signal amplification to adjust the signal level to the voltage span of the encoder, is available in a digital form or can be readily made available in the encoder circuit structure itself. Thus merely by further digital logical action and memory in accordance with the invention and provided within the encoder equipment itself the P.C.M. terminal is able to compensate the transmission level from keypad button telephone to compensate for any attenuation in the local line from the keypad M.F. telephone and in the most convenient and economic way.

It is recognised that the full advantage of this invention will now be realised when all subscribers' telephones are equipped with a M.F. keypad tone sending capability able to stimulate the gain compensation circuit of the repeaters incorporating this invention to introduce the extra gain that can be thus invoked. In these circumstances considerable economies in line plant can be made because the network can be designed and implemented against the assumption of much higher attenuations than can be permitted in the absence of such compensated gain control in the local network, providing that such gain can be invoked by all subscribers.

However most telephone administrations now have a policy of promoting the use of such M.F. keypad tone sending telephones and the percentage of such telephones equipped to the network can be expected to rise. It is beneficial to both the success of this programme of change to such M.F. tone telephones and the future general use of this invention to accompany these M.F. telephones in the network that line repeaters with such gain control in accordance with the invention or able to be adapted to such gain control and P.C.M. encoding terminals with such level control can be installed now and if equipped with the gain compensation can confer especial advantage on those telephones which are converted to such M.F. keypad working. Also that special adaptors capable of sending merely a single M.F. combination either automatically or through button pressure can be equipped to dial phones very economically and with no other change to the network so that such phones can take advantage of the gain compensation thus provided without reducing in any way the existing standard of service to all other existing or new telephones that are not thus equipped. This then confers additional benefit on those subscribers who have chosen to invest in the additional cost of a M.F. keypad telephone without imposing a penalty to those subscribers who have not. It will thus be seen that the use of keypad telephones can be expected to grow alongside the introduction of gain compensated repeaters in accordance with this invention until a sufficient percentage of subscribers have such telephones or M.F. sending attachments as to justify standardisation on the new form, at which point considerable economies of line plant will accrue in return for the increased attenuations that will then be tolerable on all the transmission paths in the network. In evaluating this factor it must be appreciated that typically over 80% of all telephone network and switching costs are vested in the line plant provision and only a relatively negligible cost is vested in the provision of the telephone instrument which small percentage will be increased only marginally by conversion to M.F. keypad sending and that in any case the additional costs of this have in most cases already been offset by other advantages both economic and functional which accrue through the adoption of this M.F. signalling technique for only the purposes previously envisaged.

I claim:

1. A method of compensating for transmission losses in a telephone system, comprising transmitting from a calling telephone station a multi-frequency tone signal of predetermined reference level derived from a tone sending device provided at said calling station, said tone sending device being of the kind intended for the purpose of sending separate control signals within the audible range capable of being transmitted from a calling to a called telephone station via the telephone speech path, for controlling supervisory functions of said telephone system, receiving said transmitted multi-frequency tone signal at a distant location connected to said calling station by way of a transmission path incurring transmission loss to be compensated, comparing said predetermined reference level and the level of said received signal, and, then, adjusting the amplification factor of a variable amplifying means provided in the telephone speech path at said distant location in accordance with the difference between the level of said received signal and said predetermined reference level.

2. A method according to claim 1, wherein said distant location is a called telephone station, and the said steps of level comparison and amplification factor adjustment are carried out automatically at said called telephone station in response to the tone signal transmitted from the calling station.

3. A method according to claim 2, wherein the transmission path in which losses are to be compensated comprises a plurality of telephone links serially connected with a subscriber telephone exchange between each two adjacent links and serving both as called station for a link established thereto from a calling station and as calling station for a link established therefrom to a succeeding called station, and wherein the compensation of said transmission losses is carried out in a plurality of stages by effecting the said amplification factor adjustment separately at each individual called station.

4. A method according to claim 3, wherein the said stages of loss compensation are carried out at each called telephone station in turn, proceeding in the direction of transmission from the calling station originating the first of the serially connected links, and wherein a tone signal from the latter calling station is used for all stages of loss compensation said signal being transmitted to each called station via any preceding subscriber telephone exchange in the transmission path and the compensated transmission path established to the latter.

5. Apparatus for providing transmission loss compensation at a predetermined location in a telephone transmission path comprising a multi-frequency tone receiver means of the kind adapted to respond to multi-frequency tone signals within the audible range capable of being transmitted via the telephone speech path from a calling to a called telephone station, in order to control switching functions in a telephone system, a variable gain amplifying means provided in said transmission path, and signal level sensing means having an input connected to said transmission path and adapted to vary the gain of the said amplifying means in order to provide gain compensation dependent upon the level of a tone signal applied thereto, the said multi-frequency tone receiver means being arranged to provide an output signal to actuate said signal level sensing means upon receipt of a predetermined multi-frequency encoded tone signal.

6. Apparatus according to claim 5, comprising a pair of hybrid circuits spaced apart in the transmission path provided by said apparatus and separating the portion of said transmission path intermediate said hybrid circuits into two unidirectional transmission channels, wherein said variable gain amplifying means comprises a variable gain amplifier in each of said channels, wherein said multi-frequency receiver means comprises a multi-frequency receiver connected to each channel, and wherein said signal level sensing means comprises a signal level sensor connected to each channel.

7. Apparatus according to claim 5, comprising a pair of hybrid circuits spaced apart in the transmission path provided by said apparatus and separating the portion of said transmission path intermediate said hybrid circuits into two unidirectional transmission channels, said amplifying means being provided only in one channel of said hybrid circuit, for compensating transmission losses.

8. Apparatus according to claim 7, wherein said amplifier means comprises a fixed gain amplifier and a variable attenuator in series therewith, in said one channel.

9. Apparatus according to claim 5, comprising a pair of hybrid circuits spaced apart in the transmission path provided by said apparatus and separating the portion of said transmission path intermediate said hybrid circuits into two unidirectional transmission channels, and wherein said amplifier means comprises a fixed gain amplifier in said one channel and a variable attenuator in a bidirectional part of the transmission path provided by said apparatus.

10. A telephone exchange system comprising a conference bridge providing for communication between its respective ports with substantially zero transmission loss; at least one incoming exchange line capable of connection to a port of said conference bridge; at least one outgoing exchange line capable of connection, via said conference bridge, with an incoming exchange line; a pair of hybrid circuits spaced apart in a transmission path between each incoming exchange line and the conference bridge in order to separate the part of the transmission path between said hybrid circuits into two unidirectional transmission channels; and amplifying means located in the unidirectional transmission channel effective in the direction of transmission towards said bridge; a variable attenuation means located in a bidirectional part of said transmission path; means for sensing the level of an incoming tone signal received via said incoming exchange line and providing an output signal to vary the attenuation of said attenuation means in accordance with the level of the incoming tone signal; means responsive to said incoming tone signal for actuating said level sensing means; a second pair of hybrid circuits spaced apart in a further transmission path between each outgoing exchange line and the conference bridge in order to separate the part of said further transmission path between said second pair of hybrid circuits into two further unidirectional transmission channels; and an amplifying means located in said further unidirectional transmission channel effective in the direction of transmission towards said bridge.

11. A telephone exchange switching system comprising a plurality of telephone subscriber lines each serving a respective telephone subscriber station equipped with a multi-frequency calling tone generator for sending encoded multi-frequency calling tones having a predetermined amplitude level, exchange switching means responsive to said encoded multi-frequency calling tones for establishing a switched connection between calling and called telephone stations, and at least one gain compensation means located in a telephone transmission path provided by said system, said gain compensation means comprising a multi-frequency tone receiver adapted to respond to said multi-frequency encoded signals, a variable gain amplifying means provided in said transmission path, and signal level sensing means having an input connected to said transmission path and adapted to vary the gain of the said amplifying means in order to provide gain compensation dependent upon the level of a tone signal applied thereto, the said multi-frequency tone receiver being arranged to provide an output signal to actuate said signal level sensing means upon receipt of a predetermined multi-frequency encoded tone signal.

* * * * *